Oct. 31, 1961 C. V. BLIVEN ET AL 3,006,441
SHOCK ABSORBER
Filed April 14, 1958 3 Sheets-Sheet 1

C. V. BLIVEN
I. J. ALLEN
INVENTORS

BY E. C. McRae
J. R. Faulkner
G. H. Oster

ATTORNEYS

Oct. 31, 1961  C. V. BLIVEN ET AL  3,006,441
SHOCK ABSORBER

Filed April 14, 1958  3 Sheets-Sheet 2

C.V. BLIVEN
I.J. ALLEN
INVENTORS

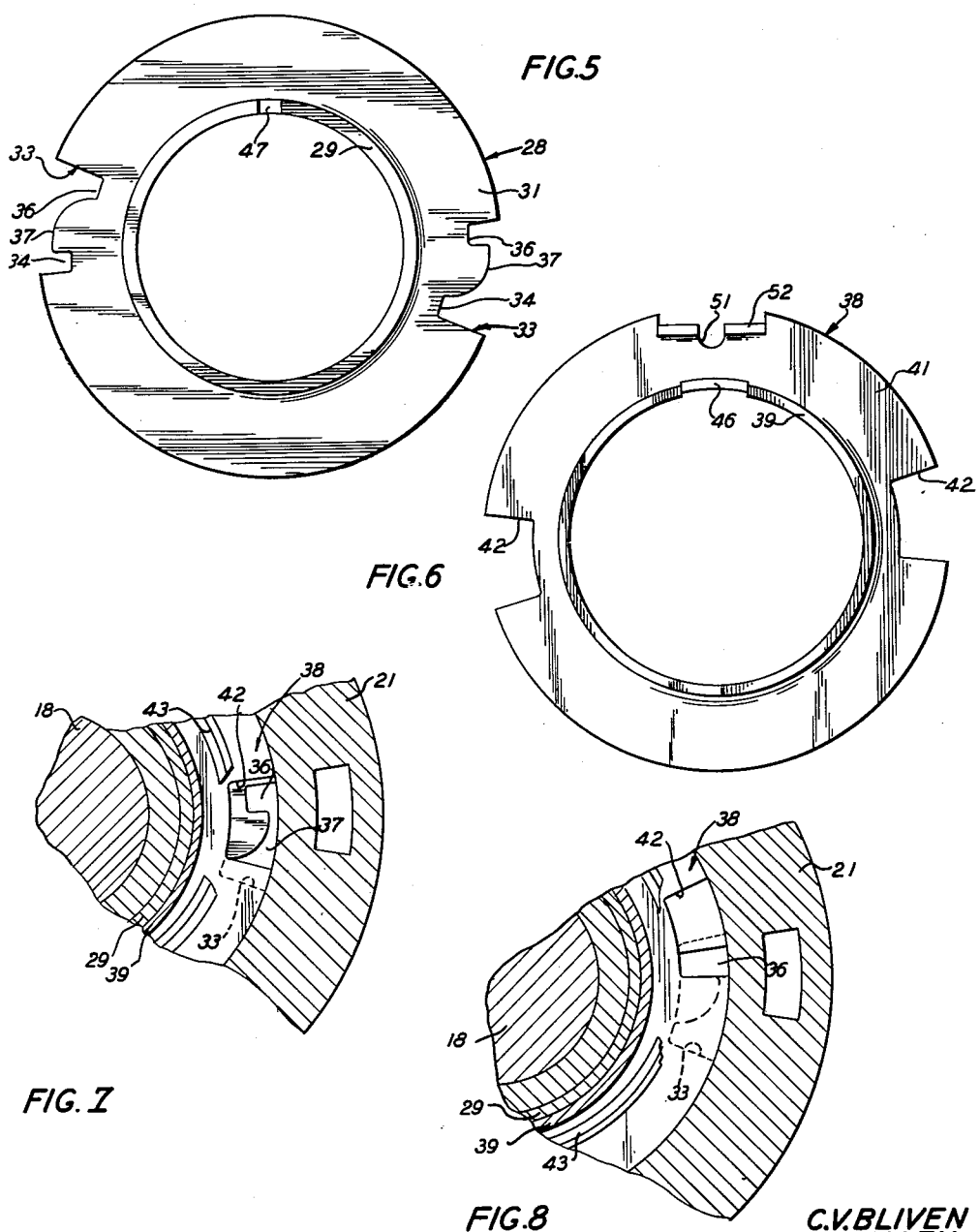

United States Patent Office 3,006,441
Patented Oct. 31, 1961

1

3,006,441
SHOCK ABSORBER
Charles V. Bliven, Belleville, and Ivis J. Allen, Ann Arbor, Mich., assignors to Ford Motor Company, Dearborn, Mich., a corporation of Delaware
Filed Apr. 14, 1958, Ser. No. 728,303
3 Claims. (Cl. 188—100)

This invention relates generally to shock absorbers, and particularly to temperature compensated shock absorbers.

An object of the present invention is to provide a shock absorber having a temperature controlled orifice of variable size, with the size of the orifice increasing as the temperature drops and decreasing as the temperature rises to compensate for the change in viscosity of the shock absorber fluid with temperature changes. In an embodiment of the invention a piston or other part forming a division between two fluid chambers of the shock absorber is provided with an opening permitting restricted fluid flow between the fluid chambers for damping purposes. A valve plate is rotatably mounted upon the shock absorber piston, and is provided with an opening adapted to overlap the opening in the piston. A bimetallic coil is connected to the valve plate to rotate the latter in one direction in response to a temperature drop, and in the opposite direction in response to a temperature rise to vary the effective opening in the piston and to provide a larger opening for the higher viscosity oil at low temperatures and a smaller opening for the lower viscosity oil at higher temperatures. The openings in the piston and the valve plate may be so shaped as to provide a nonlinear change in the effective size of the orifice in relation to temperature changes. The rate of change of the orifice area can thus be adjusted to maintain a constant damping force over a temperature range regardless of the temperature characteristics of the shock absorber fluid.

Other objects and advantages of this invention will be made more apparent as this description proceeds, particularly when considered in connection with the accompanying drawings, wherein:

FIGURE 5 is a plan view of the orifice plate of the shock absorber construction shown in the preceding views;

FIGURE 6 is a plan view of the shear plate of the shock absorber construction shown in the preceding figures;

FIGURE 7 is a fragmentary cross sectional view similar to a portion of FIGURE 3, but illustrating the relative positions of the parts after a temperature drop;

FIGURE 8 is a fragmentary cross sectional view of a portion of FIGURE 3 showing the positions of the parts after a temperature rise.

Figure 1:
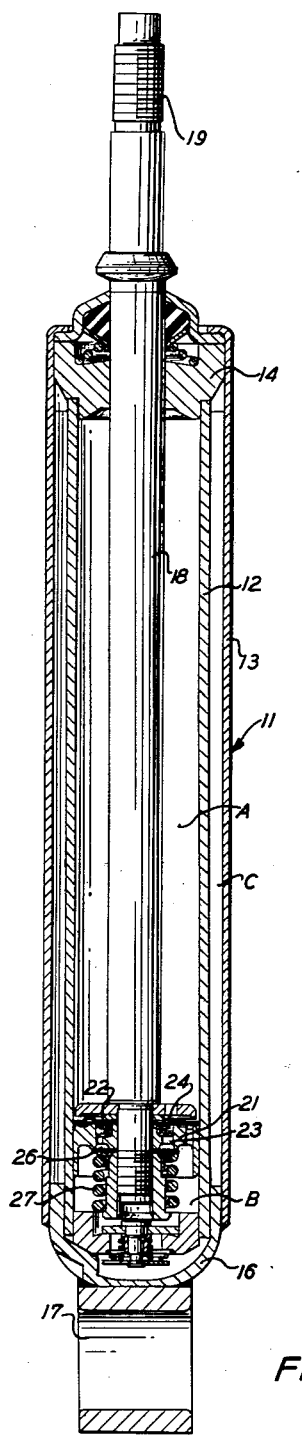
FIGURE 1 is a vertical cross sectional view through a shock absorber incorporating the present invention.

Referring now to the drawings, and particularly to FIGURE 1, the reference character 11 indicates generally a direct acting tubular type shock absorber for motor vehicle application. Inner and outer concentric cylinders 12 and 13 are provided, being interconnected at their

2 upper and lower ends respectively by end caps 14 and 16 respectively. An eye 17 is welded to the lower end cap 16, and is adapted to receive a pivotal connection carried by a suspension member of a vehicle (not shown).

A piston rod 18 is reciprocably mounted within the shock absorber, being slidably received in the upper end cap 14, and having an upper end 19 adapted to be suitably connected to a portion of the vehicle frame or body. At its lower end the piston rod 18 is reduced in diameter, and carries a piston 21 slidably received within the inner cylinder 12. It will thus be seen that relative movement between the sprung and unsprung portions of the vehicle results in relative reciprocation between the shock absorber piston 21 and the cylinder 12.

With the exception of a temperature compensated variable orifice (to be described later), the shock absorber illustrated is conventional in construction and hence will not be described in detail. In general, fluid chambers A and B are formed in the inner cylinder 12 above and below the piston 21 respectively, and a reservoir chamber C is formed between the inner and outer concentric cylinders 12 and 13. The piston 21 and the lower end cap 16 are provided with suitable conventional valving to control both the jounce and rebound movements. While the temperature compensated control of the present invention could be applied to either rebound or jounce control, or both, in the illustrated embodiment the temperature control is applied to the rebound function. The rebound forces are considerably larger than the compression forces encountered during jounce, and consequently the greater need is for compensation for the change in rebound force resulting from changes in fluid viscosity under different temperature conditions.

Figure 2:
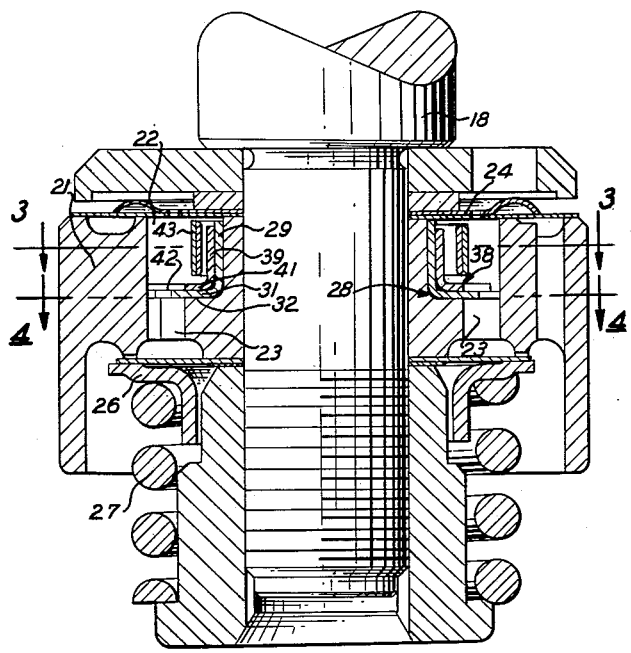
FIGURE 2 is an enlarged cross section view of a portion of the construction shown in FIGURE 1.
Figure 4:
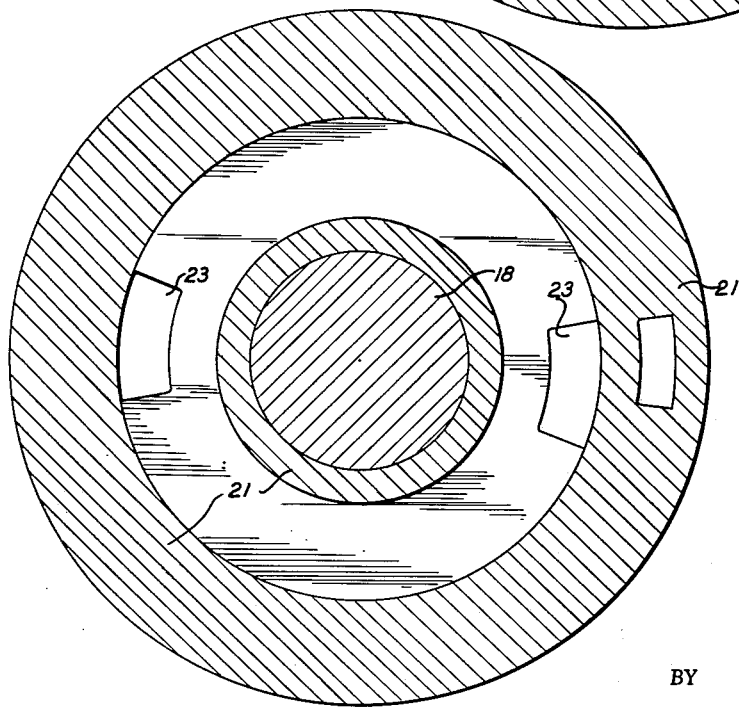
FIGURE 4 is a cross sectional view taken on the line 4—4 of FIGURE 2.

Referring now to FIGURE 2, the piston 21 is formed with an annular groove 22 communicating with a pair of generally rectangular openings 23 establishing communication through the piston between fluid chambers A and B. Reference is made to FIGURE 4 for a clearer showing of the shape and location of the rectangular openings 23.

On the rebound stroke, the piston 21 moves upwardly relative to the cylinder 12 and fluid flows through ports in the valve assembly 24 at the top of the piston into the annular chamber 22 and thence through the restricted openings 23 in the piston into the fluid chamber B beneath the piston through narrow bleeds formed between the piston and the rebound plate 26. If the relative movement between the piston and cylinder is fast enough, the rebound plate 26 will be opened against the bias of spring 27.

An orifice plate 28 (FIGURE 5) is positioned within the annular recess 22 in the piston. The orifice plate has a hub 29 slidably engaging the inner hub of the piston and a flange 31 resting against the face 32 of the piston adjacent the bottom of the recess 22, and at least partially overlapping the rectangular openings 23 in the piston.

Referring particularly to FIGURE 5, it will be noted that two opposed notches 33 of irregular shape are formed in the periphery of the flange 31 of the orifice plate 28. Each notch has a deep end portion 34 at one extremity and a shallow end portion 36 at the opposite extremity interconnected by an intermediate portion 37 of variable radial dimension to form an arcuate edge therebetween.

Figure 3:
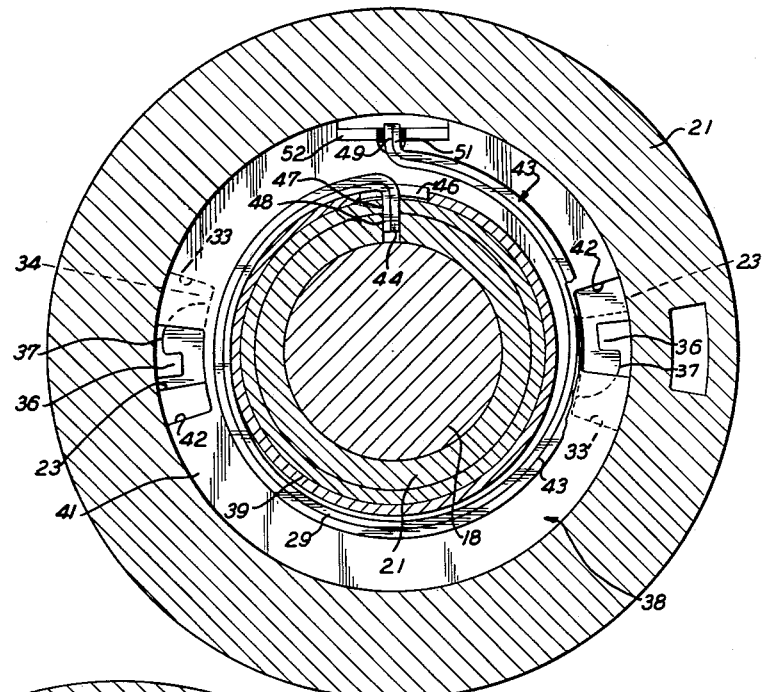
FIGURE 3 is a cross sectional view taken on the line 3—3 of FIGURE 2.

Upon reference to FIGURE 3 it will be noted that the notch 33 is generally aligned with the rectangular opening 23 in the piston to restrict the effective area of the latter.

A shear plate 38 having a hub 39 and a radially extending flange 41 is also positioned within the annular recess 22 in the piston with its hub and flange portions respectively engaging the adjacent hub and flange portions of the orifice plate 28. As best seen in FIGURE 6, the radial flange 41 of the shear plate 38 is formed with opposed notches 42 of generally rectangular shape, but with the opposed edges thereof being radial.

With particular reference now to FIGURE 3, it will be noted that the hub portions 29 and 39 of the orifice and shear plates respectively are embraced by a bi-metallic coil 43. The inner end 44 of the bimetallic coil spring is bent inwardly substantially at right angles, and extends through a notch 46 formed in the hub 39 of the shear plate 38 and through aligned notches 47 and 48 in the hub 29 of the orifice plate and in the hub of the piston respectively. The notches 47 and 48 correspond in dimension to the thickness of the end 44 of the bimetallic coil spring to form an anchor for the spring and also to hold the orifice plate 28 against rotation relative to the piston, thus maintaining the openings 33 in the flange of the orifice plate in a predetermined relationship with respect to the rectangular openings 23 through the piston.

The opposite end 49 of the bimetallic coil spring 43 is received within a groove 51 formed in a turned up flange 52 at the outer periphery of the radial flange 41 of the shear plate 38. The bimetallic coil spring 43 is exposed to the shock absorber fluid and conventionally expands or contracts in response to temperature changes of the fluid. With the construction shown, and as viewed in FIGURE 3, a temperature drop results in a clockwise rotation of the shear plate 38 while a temperature rise results in a counterclockwise rotation thereof.

FIGURE 3 illustrates the position of the shear plate 38 at an intermediate operating temperature of 75° F. Under these conditions it will be noted that the opening 42 in the radial flange of the shear plate 38 partially overlaps the aligned openings 23 and 33 in the piston and orifice plate respectively. The overlap is such as to provide an effective orifice through the piston including the relatively shallow end portion 36 of the notch in the orifice plate together with part of the intermediate portion 37 of the notch. The parts are constructed and assembled to provide a total effective orifice area through the openings in the opposite sides of the piston such that the desired damping effect is obtained during the rebound stroke of the shock absorber with shock absorber fluid of the particular viscosity at this temperature level.

Upon a drop in the temperature of the shock absorber fluid, as during cold weather or under starting conditions, the bimetallic coil spring moves the shear plate 38 to a position clockwise of the position shown in FIGURE 3, depedent upon the temperature differential. FIGURE 7 illustrates one typical low temperature condition, in this instance 0° F., and it will be noted that the shear plate 38 has been moved so that the notch 42 thereof is in alignment not only with the shallow end portion 36 of the notch in the orifice plate 28, but also with the entire intermediate portion 37. A considerably larger effective orifice area through the piston results, and this provides the desired damping characteristics even though the fluid viscosity is considerably higher at low temperatures. It will be seen that between the positions shown in FIGURES 3 and 7 the effective area of the orifice does not increase in a linear fashion, but instead in a non-linear manner due to the curvature of the intermediate portion 37 of the notch in the shear plate. This curvature can be tailored to the particular characteistrics of the fluid viscosity in relation to temperature changes and can be arranged so that the damping effect remains constant regardless of temperature change, or, if desired, the damping effect can be made variable with respect thereto in any predetermined fashion. It will be apparent that at lower temperatures the additional clockwise rotation of the shear plate will uncover part of the deeper end portion 34 of the notch in the orifice plate 28 to still further increase the effective orifice area. Due to space limitations this portion of the notch increases in a constant fashion, but since the majority of operation will be in the intermediate range of the shear plate notch, proper operating characteristics are usually obtained.

FIGURE 8 shows the relative positions of the parts upon a temperature increase to, for example, 150° F. Under these conditions the shear plate 38 is rotated in a counterclockwise direction with respect to the positions shown in FIGURES 3 and 7, and the overlap between the notches in the various members is such as to form an effective area equal to the area of the relatively shallow end portion 36 of the orifice plate notch. This smaller effective orifice area is sufficient with the higher viscosity of the fluid at this higher temperature to provide proper damping control. A further increase in temperature beyond this point will overlap part of the end portion 36 of the notch to further decrease the effective orifice area.

By properly designing the size, shape and positions of the notches in the shear and orifice plates, any desired relationship can be obtained between the effective orifice area and the temperature so as to compensate for changes in fluid viscosity and to achieve the desired damping effect. It is within the contemplation of the invention to eliminate the orifice plate, and to so shape the openings in the piston as to provide the necessary relationships. Likewise, the temperature compensation control of the present invention can be applied to orifices effective during the compression stroke of the shock absorber in vehicle jounce, and the control may, if desired, be applied to other portions of the shock absorber mechanism than the piston, as for example, the base valve in the lower end cap 16.

It will be understood that the invention is not to be limited to the exact constructions shown and described, but that various changes and modifications may be made without departing from the spirit and scope of the invention, as defined in the appended claims.

What is claimed is:

1. A telescopic type hydraulic shock absorber having a pair of relatively reciprocable parts, one of said parts forming a division between two fluid chambers and having an opening therethrough permitting restricted fluid flow between said chambers, an annular recess in said part aligned with said opening, an orifice member mounted in said annular recess and having an axially extending hub seated against the wall of said recess and a radially extending flange seated immediately adjacent the base of said recess, the radially extending flange of said orifice member having an opening therein positioned in general alignment with the opening in said part but having a different configuration than the opening in said part, a valve member rotatably mounted in said annular recess and having an axially extending hub rotatably mounted upon the hub of said orifice member and a radially extending flange positioned immediately adjacent the radially extending flange of said orifice member, the radially extending flange of said valve member having an opening therein overlapping the opening in said orifice member and providing a variable effective opening between said chambers upon rotation of said valve member relative to said orifice member, and a temperature responsive element operatively connected to said valve member to rotate the latter in response to temperature changes.

2. The structure defined by claim 1 which is further characterized in that said temperature responsive element comprises a bimetallic coil spring encircling the hub of said valve member and having one end anchored to the radially extending flange of said valve member and its opposite end anchored to said part adjacent the annular recess therein, the hubs of said orifice member and said valve member having aligned openings therein to permit the passage therethrough of said opposite end of said bimetallic coil spring.

3. The structure defined by claim 2 which is further characterized in that the opening in the hub of said valve member is larger in a circumferential direction than the adjacent end of the bimetallic coil spring to permit rotation of said valve member, and the opening in the hub of said orifice member corresponds in circumferential dimension to the adjacent end of the bimetallic element coil spring to anchor said orifice member to said part.

References Cited in the file of this patent

UNITED STATES PATENTS

| | | |
|---|---|---|
| 1,119,013 | Hapgood | Dec. 1, 1914 |
| 1,486,381 | Jaenichen | Mar. 11, 1924 |
| 2,004,904 | Peo et al. | June 11, 1935 |
| 2,347,803 | Allen et al. | May 2, 1944 |
| 2,683,505 | Girard | July 13, 1954 |

FOREIGN PATENTS

| | | |
|---|---|---|
| 1,067,393 | France | Jan. 27, 1954 |
| 643,380 | Great Britain | Sept. 20, 1950 |